Oct. 29, 1940.   W. W. KRAFT ET AL   2,220,045
OIL TREATING APPARATUS
Filed Feb. 9, 1938   5 Sheets-Sheet 2

INVENTORS
Wheaton W. Kraft, Merle A.
Zimmerman and John A. Gibb
BY Nathaniel Ely
ATTORNEY

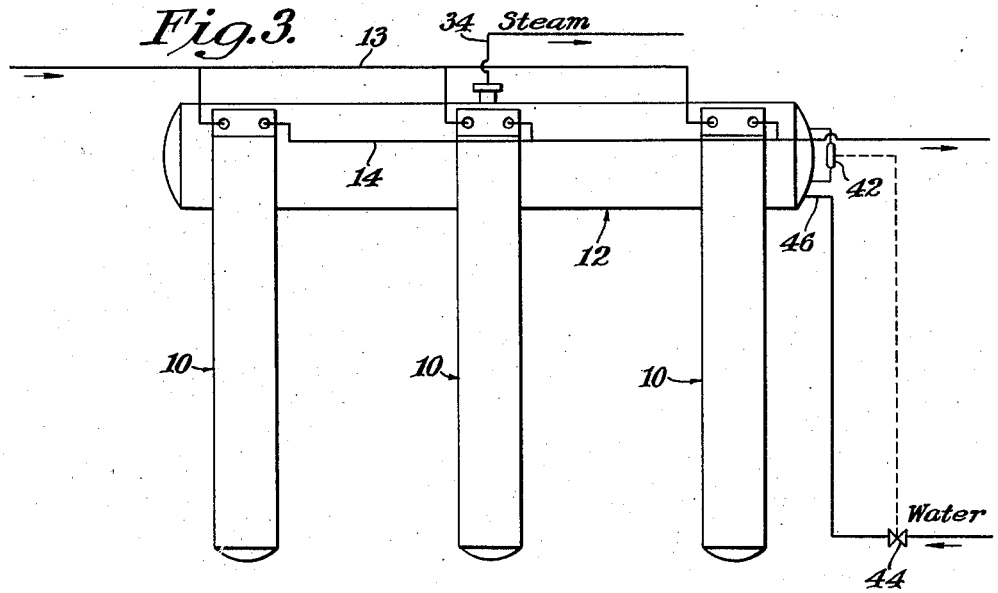
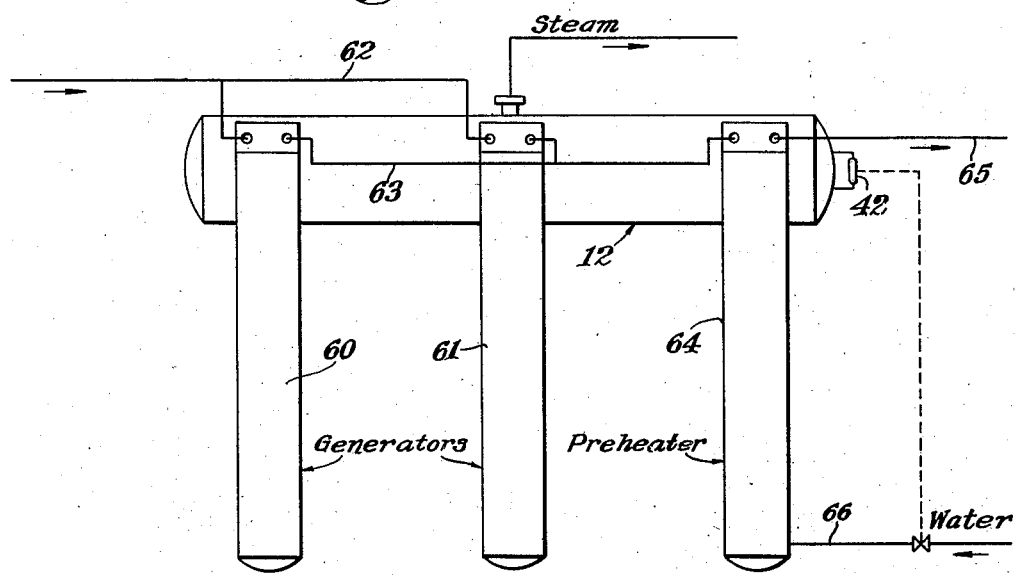

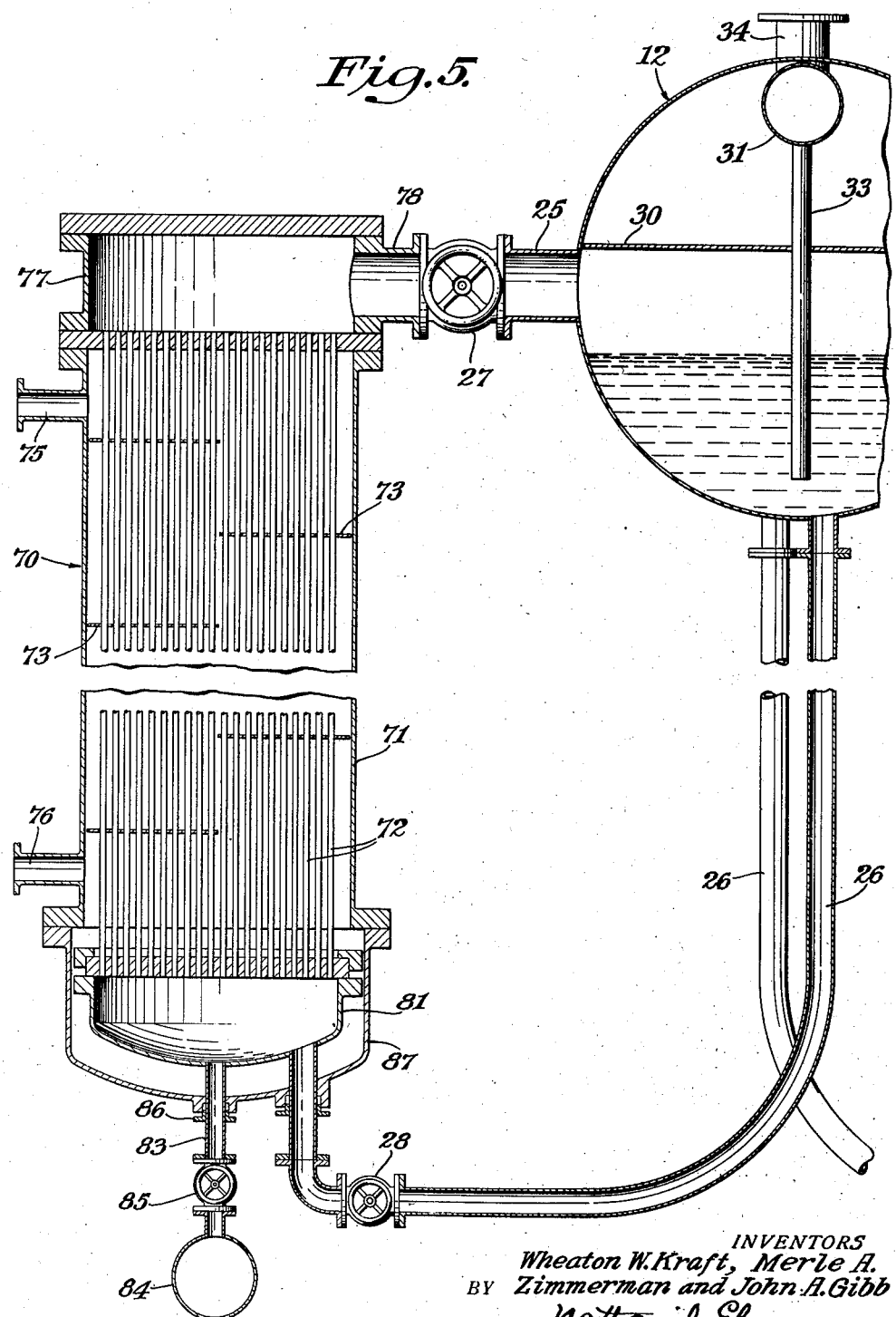

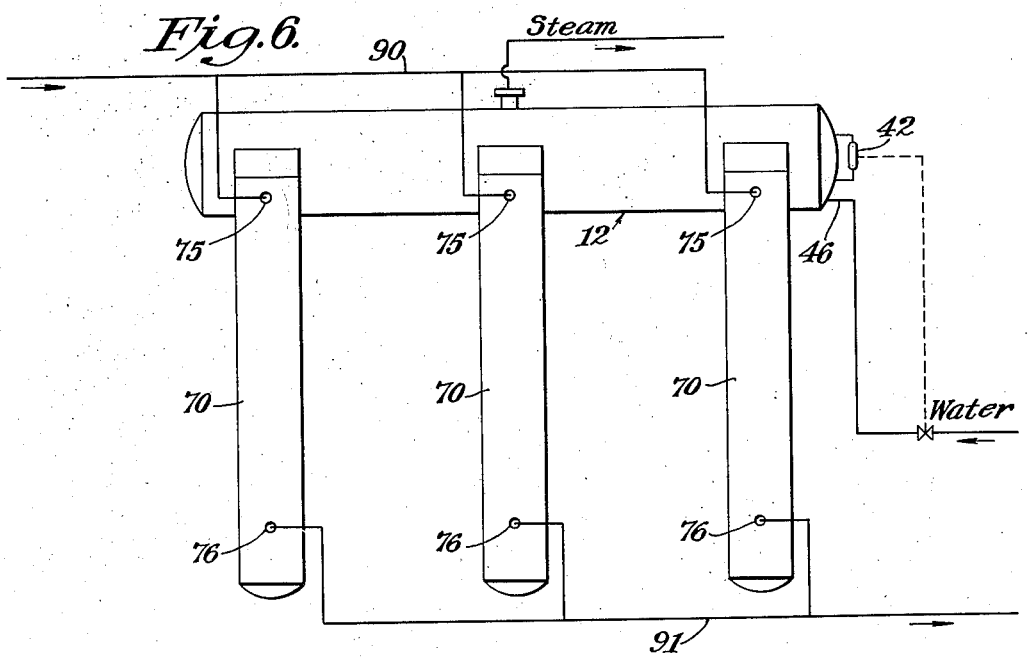
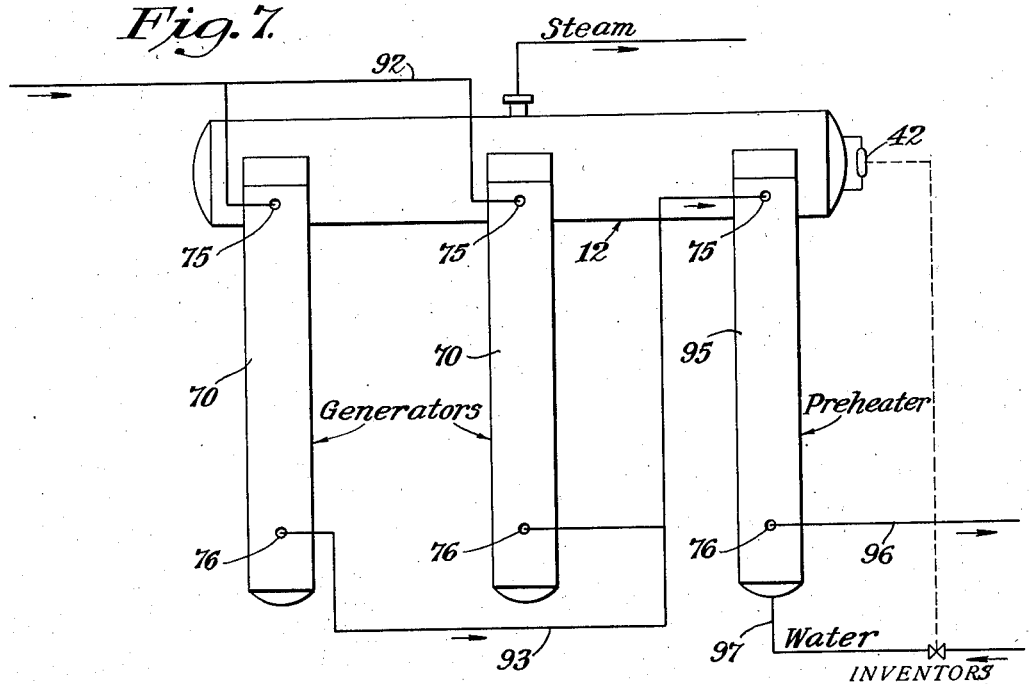

Patented Oct. 29, 1940

2,220,045

UNITED STATES PATENT OFFICE 2,220,045

OIL TREATING APPARATUS

Wheaton W. Kraft and Merle A. Zimmerman, New York, and John A. Gibb, New Rochelle, N. Y., assignors to The Lummus Company, New York, N. Y., a corporation of Delaware Application February 9, 1938, Serial No. 189,608

5 Claims. (Cl. 122—32)

This invention relates to improvements in heat exchange devices and more particularly to waste heat economizers for removing heat from hot fluids such as in petroleum and similar processes.

It has heretofore been proposed to use heat exchangers, such as of the shell and tube type, for the removal of heat from processed fluids and to use such heat for increasing the temperature of other fluids in heat exchange relation. In some cases, it has been proposed to utilize such heat for the purpose of developing steam, which steam could be effectively used in other parts of the plant or process. Such steam, however, has usually been of a very poor quality due to entrained moisture and the cost of the equipment necessary for the steam capacity has been almost prohibitive.

One of the principal objects of this invention is to provide a heat exchange arrangement for high duty steam production of relatively low initial cost, which has a common steam reservoir and controls with which a plurality of steam generating units of high ratio of heating surface to water capacity, are interconnected.

Another object of the invention is to provide an improved steam generator having a vertical heat exchanger in a closed water path with a steam drum by which automatic circulation of water is maintained across the heat exchange surfaces to increase heat transfer rates, such circulation carrying the steam into the steam drum spaced from the steam generating surfaces so that dry steam is obtained.

An additional object of the invention is to provide a single steam generating system where a multiplicity of heating streams is available, which streams may be at varying temperatures and of varying quantities.

A still further object of the invention is to provide a substantially automatic, self-contained, multiple unit steam generator having similar standard heat exchange elements which permit a flexibility of operation, and a variation in flow circuits such that variable heat exchange and fluid conditions can be accommodated without difficulty, and maintenance costs can be substantially reduced.

Further objects and advantages of the invention will appear from the following description of preferred forms of embodiment of the invention, taken in connection with the attached drawings illustrative thereof, and in which:

Figures 3 and 4 are diagrammatic side elevations of the steam generator showing various flow arrangements;

Figure 5 is a vertical section through a part of the steam generator, such figure corresponding to a part of Figure 2, but showing a modified form of construction;

Figures 6 and 7 are diagrammatic side elevations of the modified form of steam generator, in accordance with different flow arrangements.

Figure 1:
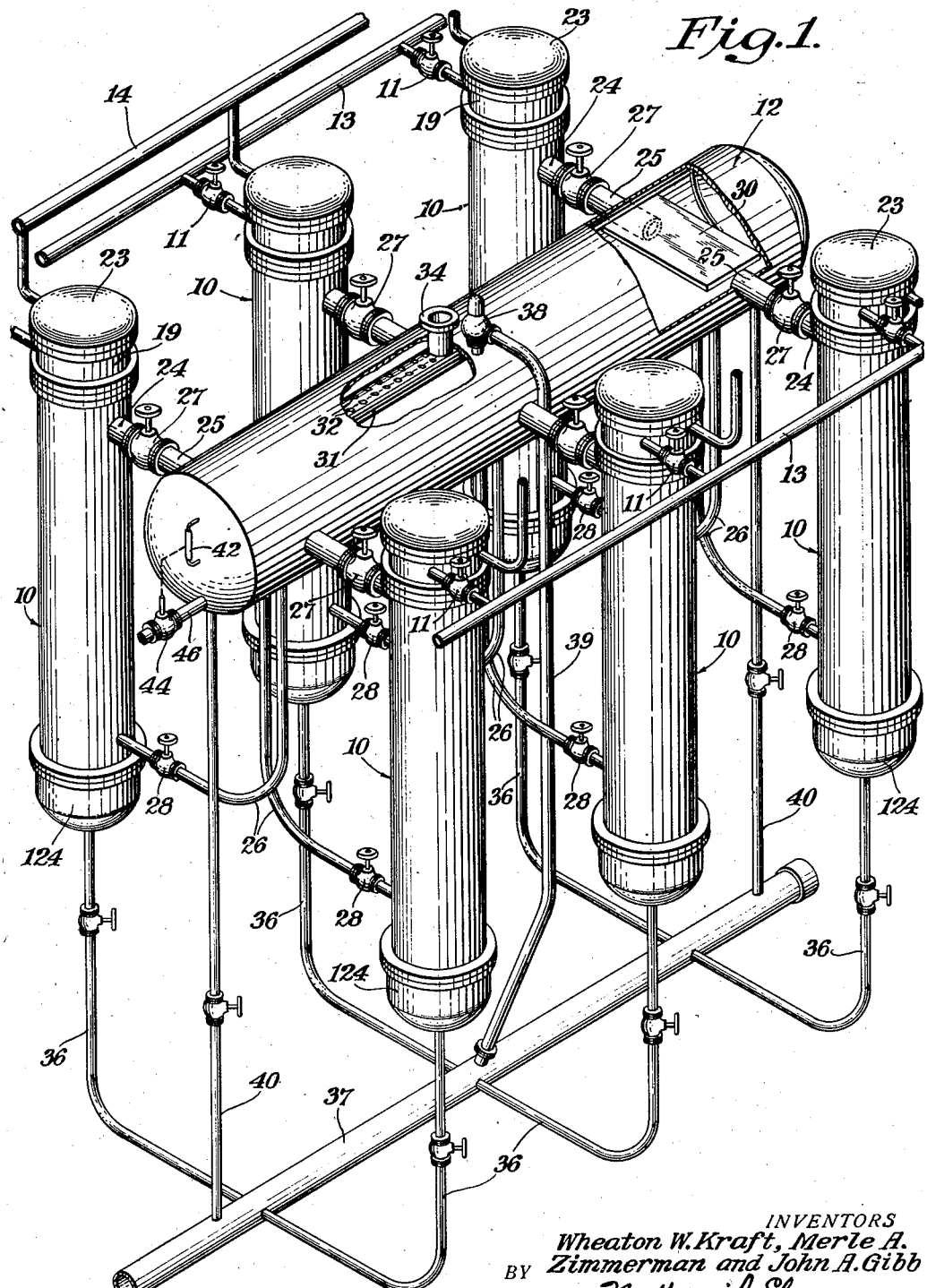
Figure 1 is an isometric drawing of a steam generator in accordance with our invention.

In accordance with one preferred form of embodiment of my invention, the improved steam generator includes a plurality of individual heat exchange units 10, interconnected to a common steam drum 12, as shown in Figure 1. These heat exchange units are adapted to evaporate water which circulates through them, by the heat of a second fluid which enters the heat exchangers as by manifold 13 and discharges as at 14.

Figure 2:
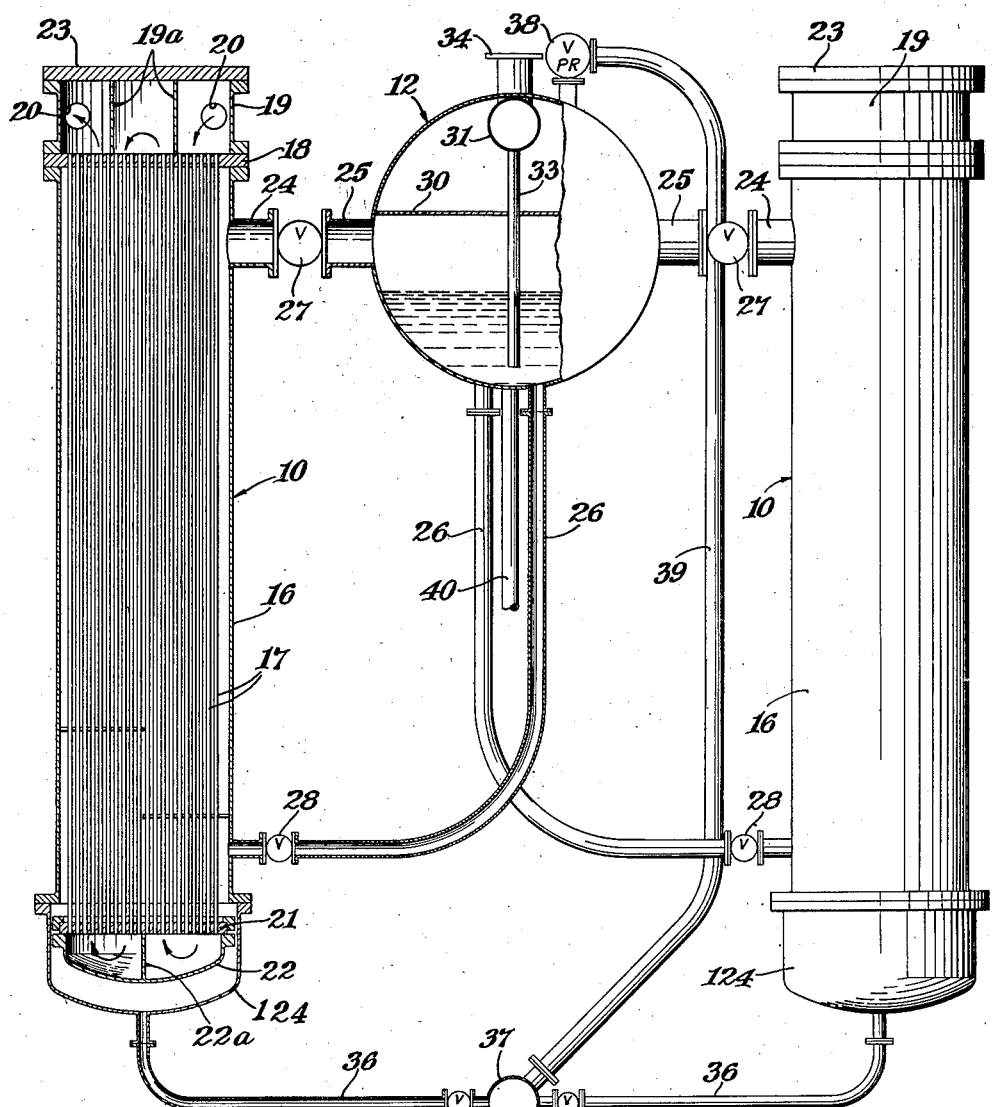
Figure 2 is an end elevation of the steam generator shown in Figure 1, with parts broken away and shown in section.

The heat exchange units each include a shell 16 and a tube bundle 17, which tube bundle is carried by a fixed tube sheet 18 as shown in Figure 2, and is surmounted by a channel 19 having inlet and outlet openings 20. The lower end of the tube bundle 17 is provided with a floating tube sheet 21 which is covered with a floating tube sheet cover 22, it being understood that the heat exchange unit 10 is of generally typical construction with fluids of the "tube side" separated from fluids on the "shell side" for the interchange of heat therebetween. In the particular form shown, the "shell side" is of single pass construction and the "tube side" is shown to be of four pass arrangement as determined by the baffles 19a and 22a.

With the arrangement shown in Figures 1 and 2, the heating fluid which enters the channel 19 and circulates through the tubes 17, is adapted to bring about the evaporation of the water which is on the "shell side." Ordinarily this is the preferred construction where the heating fluid is of a character such that it is comparatively dirty and cleaning of the tubes from time to time is necessary. This cleaning is readily accomplished by removing the channel cover 23, the shell cover 124, and the floating head cover 22.

The steam drum 12 is common to a plurality of heat exchange units 10 as shown in Figure 1 and, as shown in Figure 2, is at a normal elevation approximately in alignment with the top of the heat transfer surfaces which gives a substantial vertical elevation to the water path which is in the down-comer 26. The down-comer 26 connects the bottom of the steam drum with the lower part of the shell 16 to complete the circulation path of the water. Suitable valves 27 and 28 are used for the purpose of isolating the steam generating unit from the steam drum 12.

Under normal conditions, the high temperature fluid heating medium which passes through the tubes 17, evaporates the water in the shell 16 with the steam passing into the steam drum 12, and the water and steam in the heat exchange shell 16, because of this boiling or evaporation, is moved by the water in the down-comer 26 so that there is a relatively rapid and continuous movement of the water across the tubes 17, which constitute the heat exchanger surfaces. This increases the effective heat exchange rate and continually removes steam bubbles from the tubes and materially aids transfer of heat to the water.

The steam entering the steam drum 12 is baffled by the baffle 30, which may be a narrow member adjacent the steam inlet, to remove a substantial part of any entrained water and the steam is removed through the dry pipe 31, having the usual apertures 32 on the top which eliminate all remaining entrained moisture, such moisture draining into the drum through drain 33. The steam is discharged from the outlet pipe 34, and from this point the steam may be taken to any part of the plant which requires it and through any arrangement of throttling valves for the purpose of regulating its pressure. It is to be understood that variable pressures can be bled off if desired.

The heat exchanger shell covers 124 act as separate mud drums and each may be drained through the discharge pipe 36, interconnected to the blow-down drain 37 so that when blown down, the mud and collected sediment may be discharged into the sewer. A pressure relief valve 38, effective for all steam generating units, is also provided with a connection 39 to the blow-down drain 37 to prevent steam discharge into the air. Steam drum drains 40 may also be used to directly drain the steam drum. The water level control, diagrammatically indicated at 42, maintains the water level in the steam drum by controlling the water inlet valve 44 in the water inlet 46. With but single controls for all units, a substantial economy is attained in apparatus for controlling the steam generator.

One of the preferred arrangements of fluid flow in the generator is shown in Figure 3 and this corresponds generally with the arrangement shown in Figure 1. In this arrangement, the water which may be externally preheated, enters directly into the steam drum 12 as at 46, as required by control 42. The second or heating fluid enters each heat exchanger or steam generating unit 10 in a parallel arrangement as by the manifold 13. In a similar manner, the heating fluid is discharged from all of the steam generating units 10 through a common manifold 14. The steam is discharged at 34 from the steam drum.

In the modified circuit, as shown in Figure 4, hot fluid which is to be cooled, preferably enters only certain of the heat exchangers indicated at 60 and 61, through the manifold 62, with the discharge at 63 entering the pre-heater unit 64 from which the fluid is withdrawn for future purposes or storage at 65. The water in this case enters the preheater at 66.

It is to be understood that in many operations, particularly in the cooling down of residues, the viscosity of the material is such that at comparatively low temperatures, the material cannot be handled effectively and is likely to solidify or so seriously increase the burden on the pumps that it is handled at a very high temperature. This is particularly true of such materials as petroleum residues which have a suitable viscosity only when handled in the temperature range above 300° F. The quantity of heat, however, is such that a very substantial amount of steam can be evaporated without reducing the temperature of the residues beyond a desirable amount. Due to maintaining the system with minimum temperature at the boiling point of water under pressure, residues cannot be cooled below this temperature, hence, the residues are safeguarded against reaching too low a temperature. The desired end temperature and the amount of heat to be withdrawn will thus bring about some variation in the flow arrangement and the flow arrangement can be varied to control the operating characteristics of the process as hereafter described.

The use of a common steam drum makes it possible to materially reduce the total size of each heat exchanger shell as compared to the exposed tube bundle heating surface. Ordinarily, in a single unit heat exchanger used for steam generation, a large part of the volume of the exchanger must be provided for adequately freeing the steam from the entrained moisture so that the cost of the heat exchanger in proportion to the duty is great. In the present arrangement, the heat exchanger proper is exclusively a heat transfer device with a high ratio of heat transfer surface to shell size. Nevertheless, with a lower cost of construction, the steam can be produced of a better quality.

In some cases, where the circulating water is of a particularly dirty character, it may be preferable to pass it through the tube side of the steam generating units, as the interior of tubes are more easily cleaned. A modified form of steam generator of this type is shown in detail in Figure 5 with the circuit arrangement shown diagrammatically in Figures 6 and 7.

As in the prior construction, the steam generating units 70 are of the shell and tube type, having shells generally indicated at 71, within which are mounted tube bundles 72, and in this construction, baffles 73 are used to give a multiple pass course to the fluid on the "shell side." In this case, the fluid on the "shell side" is the heating fluid, the heat of which is to be removed by heat exchange with the water within the tubes. The hot fluid inlet and outlet are shown at 75 and 76, it being understood that the hot fluid may enter at the top for contacting the hottest fluid (mixture of water and generated steam).

The water path is always in circuit with the steam drum 12 which is similar to the preceding type of steam drum, and has a similar dry pipe 31 from which steam is drawn off at 34 and from which moisture returns to the bottom through drain 33. The steam drum in this case is on a level with the steam generating unit channel 77 which is connected by a horizontal connection 78 with the inlet 25 of the steam drum, such connection being provided with a valve 27 to facilitate isolation of the unit. Baffle 30 assists in removing entrained water entering with the steam.

The steam drum 12 is also provided with the downcomer 26 having valve 28, which downcomer is interconnected with the floating head cover 81 of the steam generating unit for completing the water path. The water level is kept at the desired level and there will be a continuous circulation as is well understood. With the water in the tubes, the relatively attenuated water streams will have a much higher velocity than in the prior cases, and this, in turn, materially increases the rate of heat transfer.

The remaining constructional features of the steam generating unit 70 are not limited to any particular form, but provision is desirably made for blowing down accumulations of sediment in the floating cover 81 which acts as a mud drum and, in Figure 5, is shown a blow-down pipe 83 which extends to a sewer connection 84, such pipe having a blow-down valve 85 for control. The blow-down pipe 83 conveniently passes through a stuffing box 86 in the shell cover 87.

The flow of heating fluid and water may be of varied arrangement with one arrangement as shown in Figure 6. In this case, the hot fluid enters from manifold 90 into the shell side of the steam generating units 70 at inlets 75, with the discharge out of the outlets 76 to manifold 91. The water enters the steam drum 12 at 46 as in the prior arrangement, and is similarly controlled by liquid level control 42. The water circulates through the tubes, however, as heretofore described.

A still further modified arrangement is shown in Figure 7 in which preheating of the water by the hot fluid is preferred, and in such case, the hot fluid is first directed by manifold 92 into certain of the steam generating units 70 and discharged at 93 into the inlet of preheater 95, from which it is discharged at 96. The water in this case enters at 97 into the preheater unit and maintains the liquid level in the other steam generating units and the drum 12 by the overflow. Other arrangements are also possible.

An important feature of the invention is the fact that each of the heat exchange units may be identical with each other unit, with the resulting high degree of flexibility in operation. It is possible to shut off any particular unit for the purpose of inspection, cleaning or repair, and by manifolding, it is possible to arrange the flow of heating fluid to accomplish any desired purpose at any desired temperature change. The examples given show the possibilities of series or parallel or series-parallel connections. Furthermore, with the multiplicity of standard units, it is necessary to carry but a single spare unit with a further economy in maintenance and installation.

Figure 8:
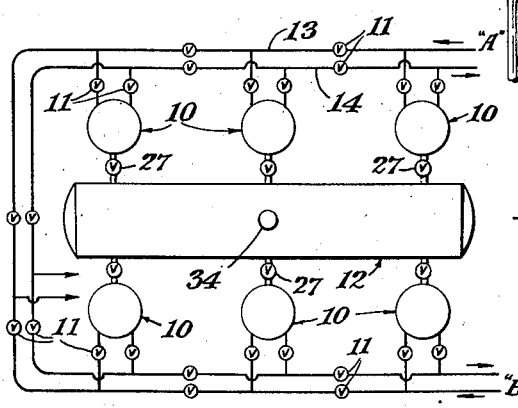
Figure 8 is a diagrammatic view, in plan, showing an arrangement of piping for controlled flow of heating fluid into the steam generating units.

As shown in Figure 8, the manifolds 13 and 14, generally designated the inlet and outlet manifolds, may be continuous and interconnected to all heat exchange units 10 which in turn are connected on the water side, to the common steam drum 12. By using control valves, generally indicated at 11 on both the inlet and outlet manifolds, it will be apparent that a plurality of fluids "A" and "B" can be directed through the separate heat exchange units. The circuit may be parallel, series, or series-parallel for various valve arrangements with the outlet also suitably arranged depending upon the number of units through which the respective fluids pass. Very accurate process control can be had by the use of such apparatus. This adaptation to plural streams is also an important advantage of the invention which is only possible with a plurality of separate heat exchange units, the control of all of which is from a common steam drum into which each transfers its share of heat.

As the apparatus is of general application, no limitations are to be considered because of the use of specific explanatory terminology. We are aware that modifications may be made to the invention and we therefore wish to consider the invention broadly as set forth in the description herein and limited only by the claims appended hereinafter.

We claim:

1. An apparatus for use with conventional petroleum distillation equipment of the type wherein a plurality of independent streams of hot oil is removed therefrom and cooled, the combination therewith of a heat exchange steam generator, said steam generator consisting of at least four identical interconnected heat exchange units, a common steam drum, means for introducing water into said units and to discharge steam into said drum, means to provide thermosyphon circulation between the steam drum and the water portion of said units, and means for passing independent streams of hot oil in heat exchange relation with said units, said means including a manifold and valve arrangement whereby the independent hot oil streams from the petroleum distillation equipment may be separately introduced into one or more of the units, the valves in said manifold permitting the number of units to be varied to correspond to changed conditions of heat of a hot oil stream.

2. An apparatus for use with conventional petroleum distillation equipment as set forth in claim 1, wherein the heat exchange units may be individually removed from communication with one another and from said manifold without shutting down the operation of the petroleum distillation equipment.

3. An apparatus for use with conventional petroleum distillation apparatus wherein a plurality of independent and different hot oil streams are removed from the distillation apparatus to be cooled, the combination therewith of a heat exchange steam generator for removing heat from the several hot oil streams flowing from the petroleum distillation apparatus, said generator comprising a common steam drum having a steam portion and a water portion, a plurality of heat exchange units of the shell and tube type having a water section and a fluid heating section, means to interconnect the water sections of all of said heat exchange units with the steam drum in the steam portion and in the water portion, and independent connections for the fluid heating sections of said heat exchange units whereby each of said heat exchange units may be connected to different fluid heating streams flowing from the petroleum distillation apparatus to jointly contribute to the heat duty in the formation of the steam, and means to control the steam pressure whereby a minimum temperature of cooling of the respective streams is effected.

4. The method of controlling the cooling of a plurality of hot petroleum streams and generating steam thereby, said petroleum streams having a normal total heat of a relatively constant amount, the heat of each of said streams varying within substantial limits, depending on operating conditions, the steps which comprise passing each of said streams through independent thermal units in heat exchange with water to form steam therefrom, passing said steam to a common point of confinement, and shifting a portion of the number of thermal units of any stream from one stream to another to compensate for the different heat exchange duty of said streams without restricting the flow of any stream.

5. An apparatus for use with conventional petroleum distillation apparatus wherein a plurality of independent and different hot oil streams are removed from the distillation apparatus to be cooled, the combination therewith of a heat exchange steam generator for removing heat from the several hot oil streams flowing from the petroleum distillation apparatus, said generator comprising a common steam drum having a steam portion and a water portion, a plurality of heat exchange units of the shell and tube type having a water section and a fluid heating section, means to feed water to the water section of said heat exchange units, means to interconnect the water sections of said heat exchange units to the steam drum and independent connections for the fluid heating sections of said heat exchange units whereby certain of said heat exchange units may be connected to different fluid heating streams flowing from the petroleum distillation apparatus to jointly contribute to the heat duty in the formation of the steam, and means to control the steam pressure whereby a minimum temperature of cooling of the respective streams is effected.

WHEATON W. KRAFT.
MERLE A. ZIMMERMAN.
JOHN A. GIBB.